United States Patent
Shah et al.

(10) Patent No.: US 7,791,237 B2
(45) Date of Patent: Sep. 7, 2010

(54) FAULT-TOLERANT SYNCHRONOUS PERMANENT MAGNET MACHINE

(75) Inventors: Manoj Ramprasad Shah, Latham, NY (US); Ayman Mohamed Fawzi EL-Refaie, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 731 days.

(21) Appl. No.: 11/612,912

(22) Filed: Dec. 19, 2006

(65) Prior Publication Data
US 2008/0143207 A1 Jun. 19, 2008

(51) Int. Cl.
*H02K 21/12* (2006.01)
*H02K 21/26* (2006.01)
*H02K 21/00* (2006.01)
*G01R 31/34* (2006.01)

(52) U.S. Cl. .............. 310/156.08; 310/156.28; 310/156.29; 310/154.01; 310/152; 318/490

(58) Field of Classification Search ........... 310/156.08, 310/156.28–156.29, 154.01, 152, 48; 318/490
See application file for complete search history.

(56) References Cited

U.S. PATENT DOCUMENTS

| | | | |
|---|---|---|---|
| 5,325,007 A | 6/1994 | Huss et al. | |
| 5,642,013 A | 6/1997 | Wavre | |
| 5,801,479 A | 9/1998 | Shinoda | |
| 5,912,522 A | 6/1999 | Rivera | |
| 5,929,549 A | 7/1999 | Trago et al. | |
| 6,127,764 A | 10/2000 | Torok | |
| 6,141,856 A | 11/2000 | Johnson et al. | |
| 6,268,673 B1 | 7/2001 | Shah et al. | |
| 6,504,281 B1 | 1/2003 | Smith et al. | |
| 6,882,080 B2 | 4/2005 | Tanaka et al. | |
| 2004/0239204 A1 | 12/2004 | Shkondin | |
| 2005/0225194 A1* | 10/2005 | Murakami et al. | 310/216 |
| 2005/0231060 A1* | 10/2005 | Vollmer | 310/216 |
| 2007/0075596 A1* | 4/2007 | Hall | 310/61 |

FOREIGN PATENT DOCUMENTS

| | | | |
|---|---|---|---|
| GB | 2271672 A * | 4/1994 | |
| JP | 58046856 A * | 3/1983 | |
| JP | 10127039 A * | 5/1998 | |

OTHER PUBLICATIONS

Machine Translation JP10127039 A (1998).*
Derwent Translation JP58046856 (1983).*
J. R. Hendershot Jr. and TJE Miller, "Design of Brushless Permanent-Magnet Motors," Magna Physics Publishing and Clarendon Press, ISBN 1-881855-03-1,1994, Section 4 pp. 4-28-4-33.

(Continued)

*Primary Examiner*—Quyen Leung
*Assistant Examiner*—Jose A Gonzalez Quinones
(74) *Attorney, Agent, or Firm*—Penny A. Clarke

(57) ABSTRACT

A fault tolerant synchronous permanent magnet machine is disclosed that reduces rotor losses by limiting eddy-current losses in the retaining sleeve. The machine limits eddy-current loss by any one or combination of axially segmenting the retaining sleeve, providing a highly electrically conductive non-magnetic shield to the retaining sleeve, and by configuring stator teeth width, stator teeth tip width, and slot distribution of the stator.

16 Claims, 4 Drawing Sheets

OTHER PUBLICATIONS

G.J. Atkinson et al., "The Influence of Stator Design on the Performance of Fault Tolerant Machines," Department of Electrical, Electronic and Computer Engineering, University of Newcastle, abstract paper.

G. J. Atkinson et al., "The Design and Fault tolerant Machines for Aerospace Applications," School of Electrical, Electronic and Computer Engineering, University of Newcastle, IEEE, 0-7803-8987-5, 2005, pp. 1863-1869.

D. Ishak et al., Permanent-Magnet Brushless Machines with Unequal Tooth Widths and Similar Slot and Pole Numbers, IEEE Transactions on Industry Applications, vol. 41, No. 2, Mar./Apr. 2005, pp. 584-590.

* cited by examiner

FAULT-TOLERANT SYNCHRONOUS PERMANENT MAGNET MACHINE

FIELD OF THE INVENTION

The present invention is directed to permanent magnet machines and more particularly to a permanent magnet machine with reduced eddy-current losses in the retaining sleeve.

BACKGROUND OF THE INVENTION

High-speed high-efficiency fault-tolerant surface permanent magnet (PM) machines are used in a variety of applications including automotive and aerospace applications, and have been found particularly effective in safety critical applications such as fuel pumps in aerospace applications.

Conventional PM synchronous electric machines employ permanent magnets as the magnetic poles of a rotor, around which a stator is disposed. The stator has a plurality of teeth that face the rotor. Alternatively, the machine may be designed so that the rotor surrounds the stator. For high-speed operation, a retaining sleeve is usually wrapped around the magnets as needed to keep the magnets in place. The retaining sleeve may be shrink fit upon the magnets to ensure a non-slip fit. Usually the retaining sleeve is made of one whole metallic piece for structural integrity. When the coils formed on the stator are energized, a magnetic flux is induced by the current through the coils, creating electromagnetic forces between the stator and the rotor. These electromagnetic forces contain tangential and/or circumferential forces that cause the rotor to rotate.

In order to achieve inherent fault-tolerance in these surface PM machines, there has to be complete electromagnetic, thermal, and physical isolation between the coils of the various phases. This is achieved by using fractional-slot concentrated windings where each coil is wound around a single stator tooth and each stator slot is occupied by one side of a coil. Since slots formed between the teeth and the permanent magnets on the rotor are spaced from each other, the magnetic flux passing through a tooth will pass through the neighboring tooth in the next moment as the rotor rotates.

This winding configuration generates significant space harmonics when the windings are excited. These harmonics generate asynchronous rotating fields in the air gap that can generate significant losses in the rotor and hence significantly reduce the machine efficiency and exacerbate heat removal. Additionally, because the retaining ring is formed of a single metallic piece for mainly mechanical reasons, it provides an easy path for the eddy currents generated by the asynchronous rotating fields in the air gap generated by the concentrated winding configuration. This significantly aggravates the rotor losses and can reduce the machine efficiency to unacceptable limits and/or cause overheating that may lead to permanent demagnetization of the magnets. These harmonics may also lead to other problems including rotor dynamic imbalance.

In order to minimize the sleeve losses and to achieve acceptable efficiency, it has been proposed to use winding configurations such as the distributed lap or distributed wave windings that have less harmonic contents but at the same time have a strong coupling among the different coils and phases. However, these winding configurations result in compromising the fault-tolerance Therefore, a need exists for a fault-tolerant, high-speed, high efficiency PM machine that operates with reduced eddy-current losses and improved operating efficiency.

Other features and advantages of the present invention will be apparent from the following more detailed description of a preferred embodiment, taken in conjunction with the accompanying drawings, which illustrate by way of example, the principles of the invention.

SUMMARY OF THE INVENTION

According to a first embodiment of the invention, a fault-tolerant synchronous permanent magnet machine is disclosed that comprises a stator having an axial length and a plurality of teeth spaced to define slots therebetween and circumferentially aligned to define an interior cylindrical surface for the stator, each of said teeth having two side faces terminating at a distal head, each of said teeth having two side faces terminating at a distal head, each of said distal heads having a head end that provides a plurality of head ends spaced around said interior cylindrical surface, a rotor having an axial length and comprising a rotor core fixed to a rotatable shaft for rotation therewith and a plurality of permanent magnets mounted on said rotor core at a plurality of locations circumferentially spaced around said rotor core facing the interior cylindrical surface of the stator, a retaining sleeve having an axial length and disposed between the permanent magnets and the interior cylindrical surface of the stator, and a gap between the retaining sleeve and the interior cylindrical surface of the stator, wherein the retaining sleeve is axially segmented.

According to a second embodiment of the invention, a fault-tolerant synchronous permanent magnet machine is disclosed that comprises a stator having an axial length and a plurality of teeth spaced to define slots therebetween and circumferentially aligned to define an interior cylindrical surface for the stator, each of said teeth having two side faces terminating at a distal head, each of said distal heads having a head end that provides a plurality of head ends spaced around said interior cylindrical surface, a rotor having an axial length and comprising a rotor core fixed to a rotatable shaft for rotation therewith and a plurality of permanent magnets mounted on said rotor core at a plurality of locations circumferentially spaced around said rotor core facing the interior cylindrical surface of the stator, a retaining sleeve having an axial length and an outer radial surface and disposed between the permanent magnets and the interior cylindrical surface of the stator, a shield disposed upon the outer radial surface of the retaining sleeve, and a gap between the shield and the interior cylindrical surface of the stator.

According to a third embodiment of the invention, a fault-tolerant synchronous permanent magnet machine is disclosed that comprises a stator having an axial length and a plurality of teeth spaced to define slots therebetween and circumferentially aligned to define an interior cylindrical surface for the stator, each of said teeth having two side faces terminating at a distal head, each of said distal heads have a head end that provides a plurality of head ends that circumferentially span said interior cylindrical surface and spaced to create slot openings to the slots, a rotor having an axial length and comprising a rotor core fixed to a rotatable shaft for rotation therewith and a plurality of permanent magnets mounted on said rotor core at a plurality of locations circumferentially spaced around said rotor core facing the interior cylindrical surface of the stator, a retaining sleeve having an axial length and an outer radial surface and disposed between the permanent magnets and the interior cylindrical surface of the stator, and a gap between the retaining sleeve and the interior cylindrical surface of the stator, wherein the slots between the plurality of teeth of the stator are irregularly circumferentially spaced.

According to a fourth embodiment of the invention, a method of reducing eddy-current losses in a permanent magnet machine is disclosed that comprises providing a permanent magnet machine comprising a stator having and axial length and a plurality of teeth spaced to define slots therebetween and circumferentially aligned to define an interior cylindrical surface for the stator, each of said teeth having two side faces terminating at a distal head, each of said teeth having two side faces terminating at a distal head, each of said distal heads having a head end that provides a plurality of head ends spaced around said interior cylindrical surface, a rotor having an axial length and comprising a rotor core fixed to a rotatable shaft for rotation therewith and a plurality of permanent magnets mounted on said rotor core at a plurality of locations circumferentially spaced around said rotor core facing the interior cylindrical surface of the stator, a retaining sleeve having an axial length and an outer radial surface and disposed between the permanent magnets and the interior cylindrical surface of the stator, and a gap between the retaining sleeve and the interior cylindrical surface of the stator; and axially segmenting the retaining sleeve.

According to a fifth embodiment of the invention, a method of reducing eddy-current losses in a permanent magnet machine is disclosed that comprises providing a permanent magnet machine comprising a stator having and axial length and a plurality of teeth spaced to define slots therebetween and circumferentially aligned to define an interior cylindrical surface for the stator, each of said teeth having two side faces terminating at a distal head, each of said teeth having two side faces terminating at a distal head, each of said distal heads having a head end that provides a plurality of head ends spaced around said interior cylindrical surface, a rotor having an axial length and comprising a rotor core fixed to a rotatable shaft for rotation therewith and a plurality of permanent magnets mounted on said rotor core at a plurality of locations circumferentially spaced around said rotor core facing the interior cylindrical surface of the stator, a retaining sleeve having an axial length and an outer radial surface and disposed between the permanent magnets and the interior cylindrical surface of the stator, and a gap between the retaining sleeve and the interior cylindrical surface of the stator; and providing a copper shield, for example, upon the outer radial surface of the retaining sleeve.

According to a sixth embodiment of the invention, a method of reducing eddy-current losses in a permanent magnet machine is disclosed that comprises providing a permanent magnet machine comprising a stator having and axial length and a plurality of teeth spaced to define slots therebetween and circumferentially aligned to define an interior cylindrical surface for the stator, each of said teeth having two side faces terminating at a distal head, each of said distal heads have a head end that provides a plurality of head ends that circumferentially span said interior cylindrical surface and spaced to create slot openings to the slots, a rotor having an axial length and comprising a rotor core fixed to a rotatable shaft for rotation therewith and a plurality of permanent magnets mounted on said rotor core at a plurality of locations circumferentially spaced around said rotor core facing the interior cylindrical surface of the stator, a retaining sleeve having an axial length and an outer radial surface and disposed between the permanent magnets and the interior cylindrical surface of the stator, and a gap between the retaining sleeve and the interior cylindrical surface of the stator; and forming the slots between the plurality of teeth of the stator such that that slots are irregularly circumferentially spaced.

Further aspects of the method and apparatus are disclosed herein. The features as discussed above as well as other features and advantages of the present invention will be appreciated and understood by those skilled in the art from the following detailed description and drawings.

DETAILED DESCRIPTION OF THE INVENTION

Disclosed herein is a fault-tolerant synchronous permanent magnet machine and method for providing a fault-tolerant synchronous permanent magnet (PM) machine. The disclosed PM machine has reduced rotor loss because of improvements in directing and reducing eddy-currents in the rotor.

Figure 1:
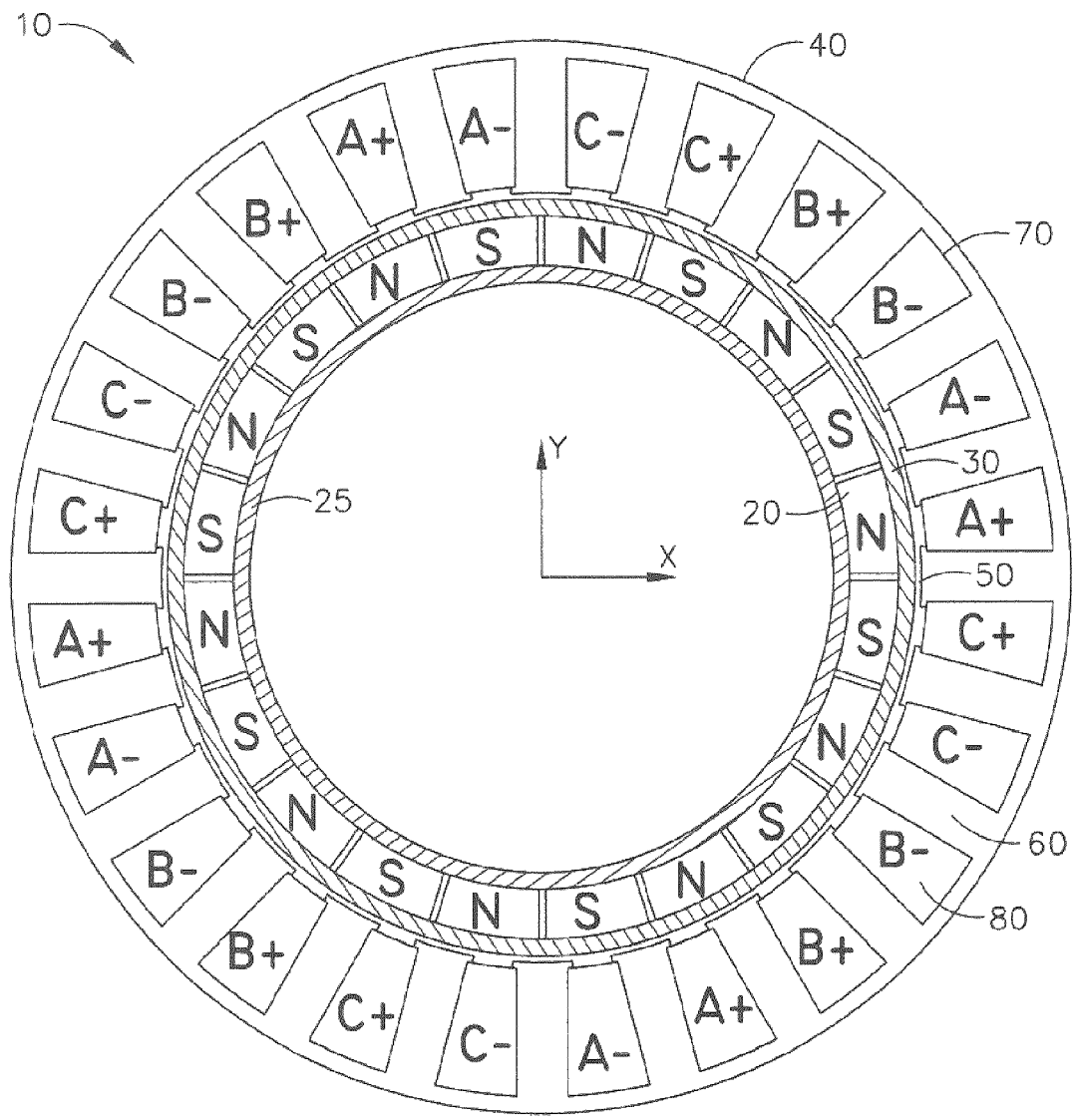
FIG. 1 is a cross-sectional view of a prior art PM machine.

A prior art PM machine 10 is shown at FIG. 1. As can be seen in FIG. 1, the prior art PM machine 10 contains a plurality of magnets 20 provided in a radial arrangement upon a back iron 25 that is disposed around a shaft (not shown). The back iron 25 is also known as a yolk. The magnets 20 are surrounded by a retaining sleeve 30. A stator 40 surrounds the retaining sleeve 30 and is separated from the magnets 20 by a gap 50. The stator 40 that has of a plurality of radial disposed teeth 60 that form stator slots 70. The teeth 60 are wound with coils 80 that substantially fill the stator slots 70 as is conventional in the art.

Figure 2:
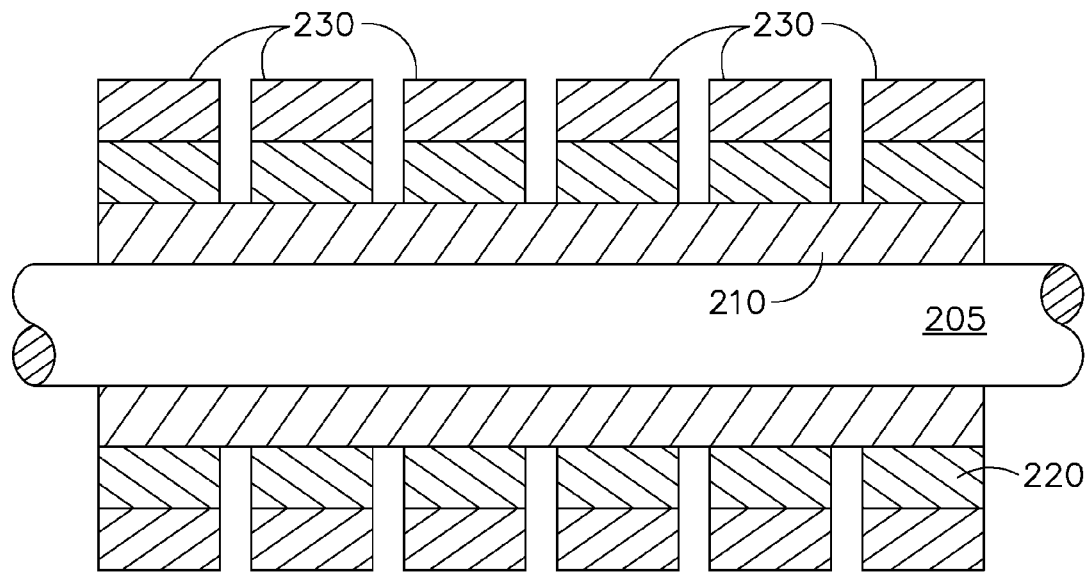
FIG. 2 is a partial sectional view of an embodiment of the current invention.

Referring now to FIG. 2, an embodiment of the invention showing the segmented retaining sleeve 200 is shown. As is shown in FIG. 2, a shaft 205 was surrounded by a cylindrical rotor 210. The rotor 210 had magnets 220 placed thereupon. A segmented retaining sleeve 230 surrounded the magnets 220.

The inventors have found, that by segmenting the retaining sleeve 230, a greater than 14 percent reduction in rotor loss can be achieved. This improvement results from the effect the segmenting has on the level of electromagnetic coupling that results in reduced eddy-currents.

In particular, the inventors have unexpectedly discovered that when the retaining ring is segmented into four or more segments, a significant improvement in eddy-current loss may be realized. For a particular machine, a retaining sleeve was segmented into four sections that resulted in an eddy-current loss reduction of approximately 14%. Another retaining sleeve was segmented into six sections and resulted in an eddy-current loss reduction of approximately 40%. A retaining sleeve segmented into eight sections resulted in an eddy-current loss reduction of 56%. However, segmenting a retaining sleeve into two sections resulted in an increase in eddy-current loss of 8%.

In a second embodiment of the invention, the inventors have discovered that placing an electrically conductive, non-magnetic material shield upon the retaining sleeve resulted in a reduction in eddy-current loss. The electrically conductive, non-magnetic material shield may be made of materials, nonlimiting examples of which include copper and copper alloys. In a particular embodiment, the shield is made of copper and copper alloys. The shield may be placed upon a segmented or non-segmented retaining sleeve.

Figure 3:
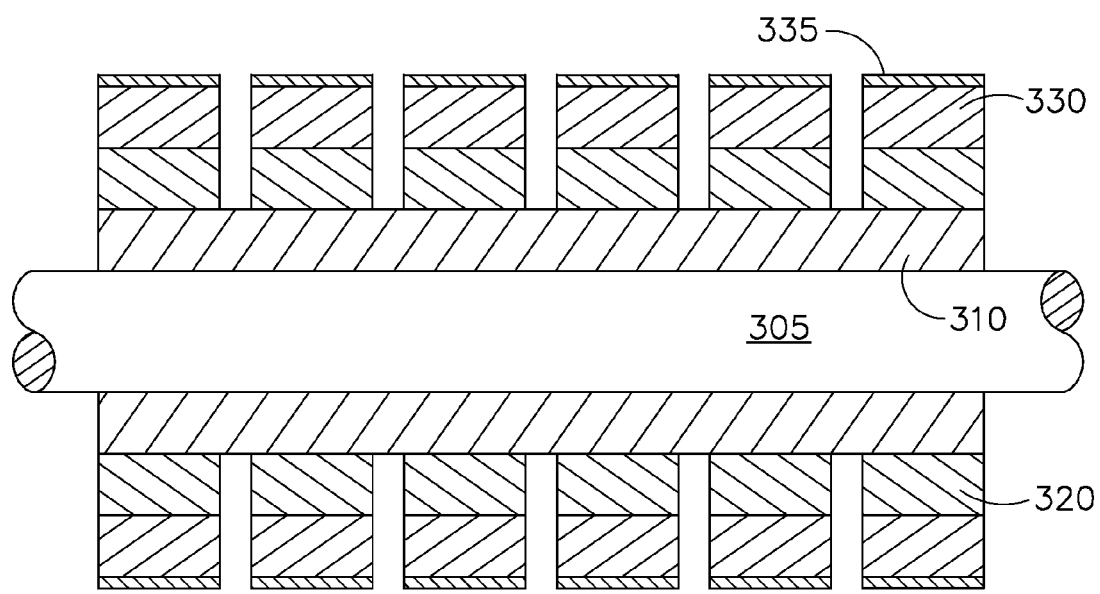
FIG. 3 is a partial sectional view of a second embodiment of the current invention.

In this embodiment, as shown in FIG. 3, a shaft 305 is surrounded by a cylindrical rotor back iron 310. The rotor 310 has magnets 320 placed thereupon. A segmented retaining sleeve 330 surrounds the magnets 320. A copper shield 335 is placed on the segmented retaining sleeve 330. A copper sleeve of about 2 mm thick resulted in an eddy-current loss reduction of about 75%.

Figure 4:
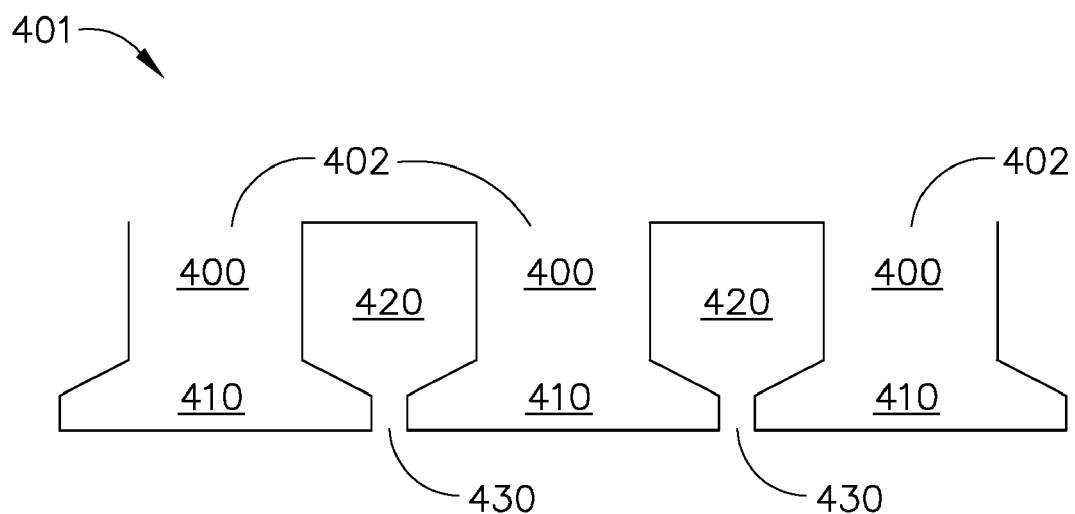
FIG. 4 is an illustration of the third embodiment of the current invention

In a third embodiment of the invention, the stator structure is modified to reduce eddy-current loss. A standard slot distribution 401 is shown in FIG. 4. FIG. 4 shows a series of stator teeth 402 formed of teeth body sections 400 and teeth head sections 410. The teeth body sections 400 and teeth head sections are of equal width. The spacing of the stator teeth 402 forms stator slots 420. The spacing between the stator head sections 410 forms stator slot openings 430. This stator structure provides for a regular distribution of both stator slots 420 and stator slot openings 430.

Figure 5:
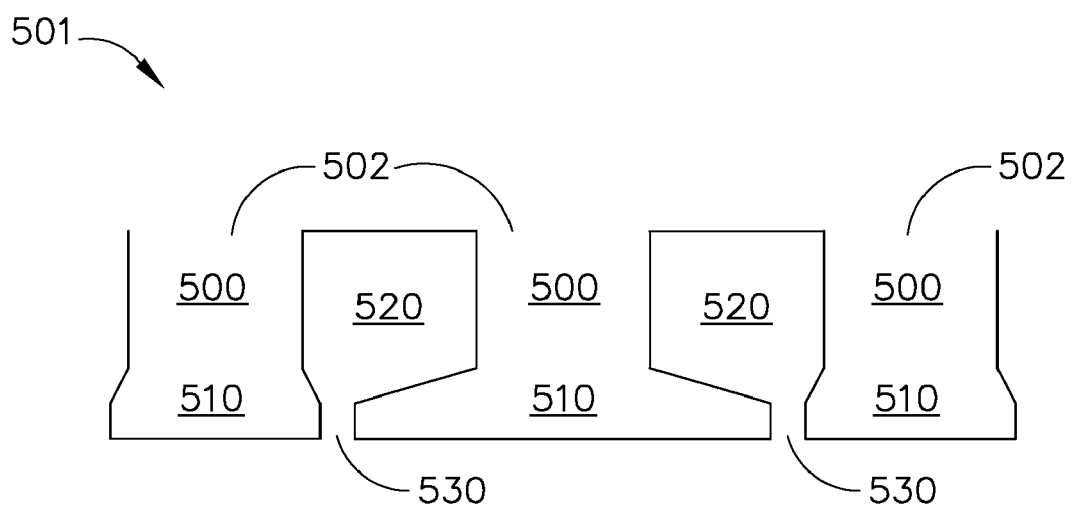
FIG. 5 is an illustration of a first variation of the third embodiment of the current invention.

In a first variation of this embodiment, an irregular slot opening distribution 501 is shown in FIG. 5. In FIG. 5, stator teeth 502 are shown with teeth body sections 500 and teeth head sections 510. The teeth body sections 500 are of equal width, but the teeth head sections 510 are of irregular width. The spacing of the stator teeth 502 forms stator slots 520. The spacing between the stator head sections 510 forms stator slot openings 530. This stator structure provides for a regular distribution of stator slots 520 but an irregular distribution of stator openings 530. The inventors have found that eddy-current loss can be reduced by up to 10% by forming a stator according to this variation.

Figure 6:
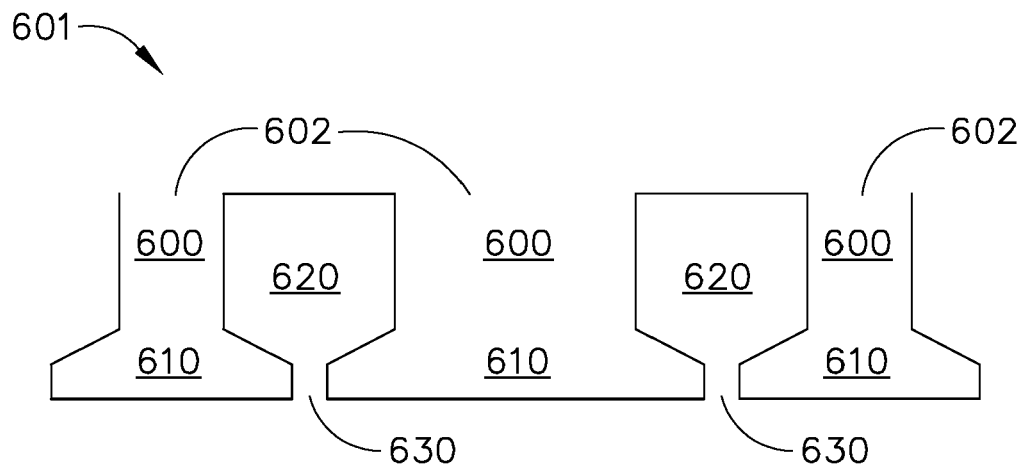
FIG. 6 is an illustration of a second variation of the third embodiment of the current invention.

In a second variation of this embodiment, an irregular slot opening distribution and an irregular slot distribution 601, is shown in FIG. 6. In FIG. 6, the stator teeth 602 are shown with teeth body sections 600 and teeth head sections 610. The teeth body sections 600 and the teeth head sections 610 are of unequal width. The spacing of the stator teeth 602 forms stator slots 620. The spacing between the stator head sections 610 forms stator slot openings 630. This stator structure provides for an irregular distribution of stator slots 620 and stator openings 630. The inventors have found that eddy-current loss can be reduced by up to 30% by forming a stator according to this variation.

Figure 7:
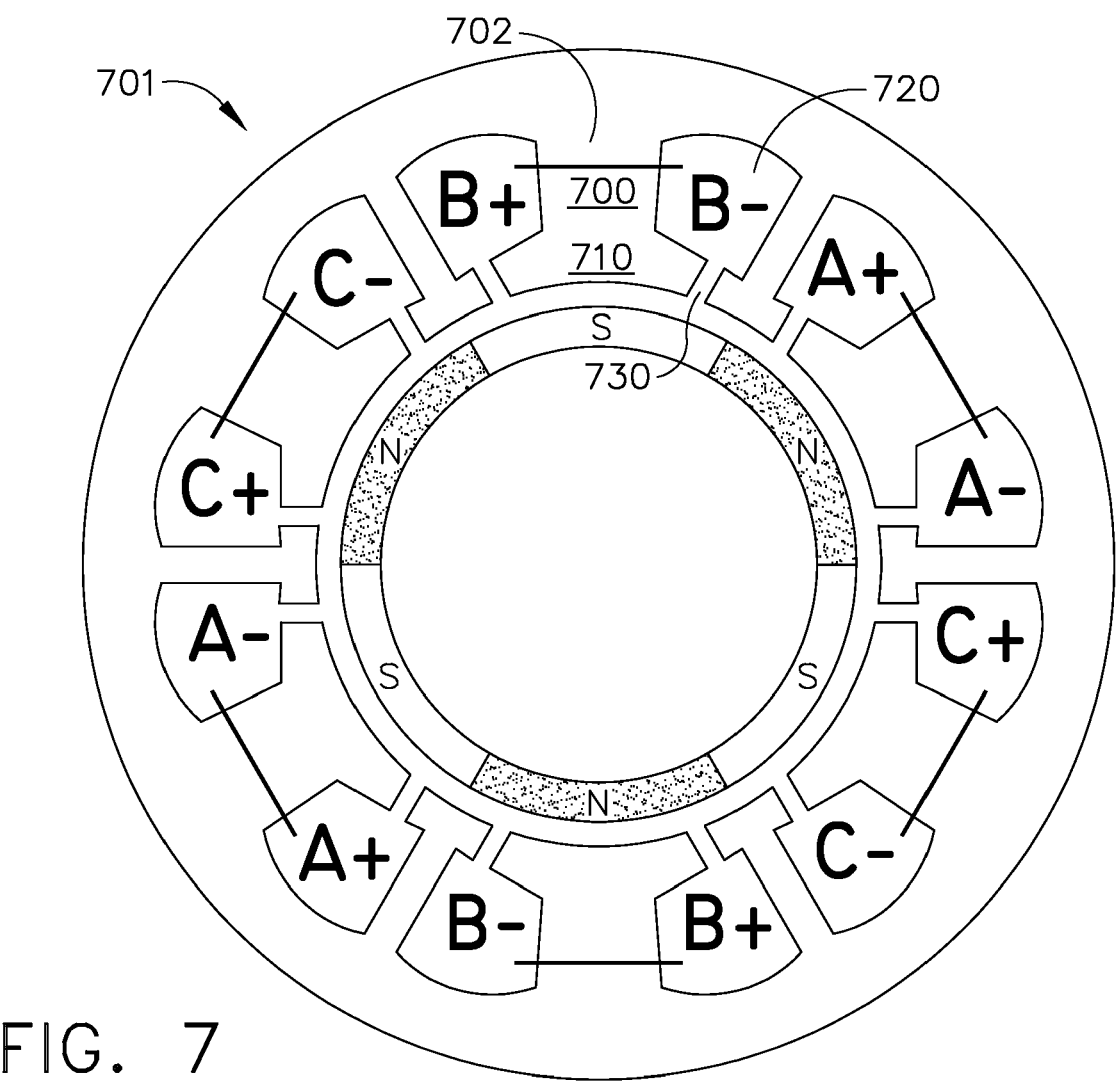
FIG. 7 is a partial cross sectional view of the second variation of the third embodiment of the current invention.

FIG. 7 illustrates the second variation of the third embodiment in a partial cross sectional view of a PM machine 701 having windings A, B and C, with polarity as shown. As shown in FIG. 7, the PM machine is formed with stator teeth 702 formed of a stator teeth body sections 700 and a stator teeth head sections 710. The width of both the stator body sections 700 and the stator head sections 710 is irregular in partially forming the PM machine 701. This stator structure provides for an irregular distribution of stator slots 720 and stator slot openings 730. FIG. 7 illustrates the variation of the third embodiment that provides for a irregular distribution of slots 620, but an irregular distribution of slot openings 630.

Additionally, the inventors have found that it is possible to combine the embodiments of their discoveries to further decrease eddy-current loss. While the combination of the embodiments may not provide a direct additional savings to eddy-current loss, a combined benefit is still realized. As such, a PM machine may be provided with a shield upon the retaining sleeve that may be segmented or non-segmented. Furthermore, it is possible to combine the variations of stator teeth and slot configurations with the segmented sleeve and shield embodiments to further reduce eddy-current loss.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A fault-tolerant synchronous permanent magnet machine, comprising:
   a stator having an axial length and a plurality of teeth spaced to define slots therebetween and circumferentially aligned to define an interior cylindrical surface for the stator, each of said teeth having a head end that provides a plurality of head ends spaced around said interior cylindrical surface;
   a rotor having an axial length and comprising a rotor core fixed to a rotatable shaft for rotation therewith and a plurality of permanent magnets mounted on said rotor core at a plurality of locations circumferentially spaced around said rotor core facing the interior cylindrical surface of the stator; and
   a retaining sleeve having an axial length and disposed between the permanent magnets and the interior cylindrical surface of the stator,
   wherein a gap is defined between the retaining sleeve and the interior cylindrical surface of the stator, and
   wherein the permanent magnets and the retaining sleeve are axially segmented into at least four segments to reduce eddy-current losses within the permanent magnet machine.

2. A fault-tolerant synchronous permanent magnet machine, comprising:
   a stator having an axial length and a plurality of teeth spaced to define slots therebetween and circumferentially aligned to define an interior cylindrical surface for the stator, each of said teeth having two side faces terminating at a distal head, each of said distal heads having a head end that provides a plurality of head ends spaced around said interior cylindrical surface;
   a rotor having an axial length and comprising a rotor core fixed to a rotatable shaft for rotation therewith and a plurality of permanent magnets mounted on said rotor core at a plurality of locations circumferentially spaced around said rotor core facing the interior cylindrical surface of the stator;
   a retaining sleeve having an axial length and an outer radial surface and disposed between the permanent magnets and the interior cylindrical surface of the stator, wherein the permanent magnets and the retaining sleeve are axially segmented into at least four segments; and
   a shield disposed upon the outer radial surface of the retaining sleeve,
   wherein a gap is defined between the shield and the interior cylindrical surface of the stator.

3. The machine of claim 2, wherein the shield comprises an electrically conductive, nonmagnetic material.

4. The machine of claim 3, wherein the shield comprises copper.

5. A fault-tolerant synchronous permanent magnet machine, comprising:

a stator having an axial length and a plurality of teeth spaced to define slots therebetween and circumferentially aligned to define an interior cylindrical surface for the stator, each of said teeth having two side faces terminating at a distal head, each of said distal heads have a head end that provides a plurality of head ends that circumferentially span said interior cylindrical surface and spaced to create slot openings to the slots;

a rotor having an axial length and comprising a rotor core fixed to a rotatable shaft for rotation therewith and a plurality of permanent magnets mounted on said rotor core at a plurality of locations circumferentially spaced around said rotor core facing the interior cylindrical surface of the stator;

a retaining sleeve having an axial length and an outer radial surface and disposed between the permanent magnets and the interior cylindrical surface of the stator, wherein the permanent magnets and the retaining sleeve are axially segmented into at least four segments to reduce eddy-current losses within the permanent magnet machine, wherein a gap is defined between the retaining sleeve and the interior cylindrical surface of the stator, and wherein the slots between the plurality of teeth of the stator are irregularly circumferentially spaced.

6. The machine of claim 5, wherein the slots of the stator are irregularly spaced because of a variable thickness of the stator teeth.

7. The machine of claim 5, wherein the slot openings are irregularly circumferentially spaced.

8. The machine of claim 6, wherein the slot openings are irregularly circumferentially spaced.

9. The machine of claim 5, wherein a shield is disposed on the outer radial surface of the retaining sleeve.

10. The machine of claim 6, wherein a shield is disposed on the outer radial surface of the retaining sleeve.

11. The machine of claim 9, wherein the shield comprises copper.

12. A method of reducing eddy-current losses in a permanent magnet machine, comprising:
providing an permanent magnet machine comprising:
a stator having and axial length and a plurality of teeth spaced to define slots therebetween and circumferentially aligned to define an interior cylindrical surface for the stator, each of said teeth having two side faces terminating at a distal head, each of said teeth having two side faces terminating at a distal head, each of said distal heads having a head end that provides a plurality of head ends spaced around said interior cylindrical surface,
a rotor having an axial length and comprising a rotor core fixed to a rotatable shaft for rotation therewith and a plurality of permanent magnets mounted on said rotor core at a plurality of locations circumferentially spaced around said rotor core facing the interior cylindrical surface of the stator, and
a retaining sleeve having an axial length and an outer radial surface and disposed between the permanent magnets and the interior cylindrical surface of the stator,
wherein a gap is defined between the retaining sleeve and the interior cylindrical surface of the stator; and
axially segmenting the permanent magnets and the retaining sleeve into at least four segments to reduce eddy-current losses within the permanent magnet machine.

13. The method of claim 12, further comprising:
providing a copper shield upon the outer radial surface of the retaining sleeve.

14. A method of reducing eddy-current losses in a permanent magnet machine, comprising:
providing a permanent magnet machine comprising:
a stator having an axial length and a plurality of teeth spaced to define slots therebetween and circumferentially aligned to define an interior cylindrical surface for the stator, each of said teeth having two side faces terminating at a distal head, each of said teeth having two side faces terminating at a distal head, each of said distal heads having a head end that provides a plurality of head ends spaced around said interior cylindrical surface,
a rotor having an axial length and comprising a rotor core fixed to a rotatable shaft for rotation therewith and a plurality of permanent magnets mounted on said rotor core at a plurality of locations circumferentially spaced around said rotor core facing the interior cylindrical surface of the stator, and
a retaining sleeve having an axial length and an outer radial surface and disposed between the permanent magnets and the interior cylindrical surface of the stator, wherein the permanent magnets and the retaining sleeve are axially segmented into at least four segments,
wherein a gap is defined between the retaining sleeve and the interior cylindrical surface of the stator; and
providing a copper shield upon the outer radial surface of the retaining sleeve.

15. A method of reducing eddy-current losses in a permanent magnet machine, comprising:
providing a permanent magnet machine comprising:
a stator having an axial length and a plurality of teeth spaced to define slots therebetween and circumferentially aligned to define an interior cylindrical surface for the stator, each of said teeth having two side faces terminating at a distal head, each of said distal heads have a head end that provides a plurality of head ends that circumferentially span said interior cylindrical surface and spaced to create slot openings to the slots,
a rotor having an axial length and comprising a rotor core fixed to a rotatable shaft for rotation therewith and a plurality of permanent magnets mounted on said rotor core at a plurality of locations circumferentially spaced around said rotor core facing the interior cylindrical surface of the stator, and
a retaining sleeve having an axial length and an outer radial surface and disposed between the permanent magnets and the interior cylindrical surface of the stator; wherein the permanent magnets and the retaining sleeve are axially segmented into at least four segments to reduce eddy-current losses within the permanent magnet machine, and wherein a gap is defined between the retaining sleeve and the interior cylindrical surface of the stator; and
forming the slots between the plurality of teeth of the stator such that the slots are irregularly circumferentially spaced.

16. The method of claim 15, further comprising:
forming the head ends to irregularly circumferentially space the slot openings.

* * * * *